(12) United States Patent
Morikawa et al.

(10) Patent No.: US 6,422,200 B1
(45) Date of Patent: Jul. 23, 2002

(54) SELF-IGNITING ENGINE

(75) Inventors: Koji Morikawa; Makoto Kaneko; Nobumasa Kani; Youhei Saisyu; Jin Itoh, all of Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/943,023

(22) Filed: Aug. 30, 2001

(30) Foreign Application Priority Data

Sep. 6, 2000 (JP) ........................................ 2000-270614

(51) Int. Cl.$^7$ ................................................. F02B 5/00
(52) U.S. Cl. ..................................... 123/305; 123/90.15
(58) Field of Search .............................. 123/305, 90.15, 123/90.16, 295

(56) References Cited

U.S. PATENT DOCUMENTS 5,865,153 A * 2/1999 Matsumoto .................. 123/299
6,006,720 A * 12/1999 Yanagihara et al. ........ 123/305
6,062,195 A * 5/2000 Tanaka et al. ............... 123/305
6,293,246 B1 * 9/2001 Tanahashi .................... 123/305

FOREIGN PATENT DOCUMENTS

JP 11-210539 8/1999

* cited by examiner

Primary Examiner—Bibhu Mohanty
(74) Attorney, Agent, or Firm—Frishauf, Holtz, Goodman & Chick, P.C.

(57) ABSTRACT

In a self-igniting possible range, both intake and exhaust valves are placed in a closure condition for a period from the end of an exhaust stroke and the beginning of an intake stroke for establishing a negative overlap period in which a residual gas is pressurized to increase its temperature, thus raising the air fuel mixture temperature in a combustion chamber up to a self-igniting possible temperature. In addition, when a crank angle reaches a predetermined crank angle in the first half of an intake stroke, a fuel is injected from an in-cylinder injector into the combustion chamber. This fuel injected becomes a premixed air fuel because of being evaporated by the gas temperature in the combustion chamber, and on shifting to a compression stroke afterwards, the temperature in the combustion chamber reaches the self-igniting possible temperature.

6 Claims, 7 Drawing Sheets

SELF-IGNITING ENGINE

This application claims benefit of Japanese Application Number 2000-270614 filed on Sep. 6, 2000, the contents of which are incorporated by this reference.

BACKGROUND OF THE INVENTION

1. Field of the Invention

The present invention relates to a self-igniting engine by igniting an air fuel mixture at multi-points.

2. Description of the Related Art

So far, there have been studied various types of engine operating techniques, for example, not only operating by a spark ignition but also by a self-igniting engine using a compression heat in dependency on a driving range for controlling an emission of toxic gases from a gasoline engine. In the case of such a self-igniting engine, although the quantity of NOx to be generated in an emission gas is considerably reducible, difficulty is encountered in positively controlling the ignition timing as well as an ordinary spark ignition type gasoline engine because the combustion depends on the self-igniting method.

Such a conventional self-igniting type engine has been disclosed in Japanese Unexamined Patent Publication No. 11-210539. In the case of the self-igniting type gasoline engine disclosed in this Publication, the gas temperature (air fuel mixture temperature) for igniting the air fuel mixture within a combustion chamber is set to a little lower temperature than a temperature causing the self-igniting, and the air fuel mixture is ignited by spark plug within that range by increasing the internal pressure in the cylinder by the combustion of the air fuel mixture around the spark plug for increasing the gas temperature therein as whole, thereby multi-point-igniting the entire air fuel mixture.

However, in a case where the self-igniting timing is controlled by the ignition timing of the spark plug like this as disclosed in the aforesaid publication, there is a need to control the air fuel mixture temperature to be within a ignition temperature range which is impossible for self-igniting. For example, in a case where the air fuel mixture temperature reaches the temperature which does not rely on sparking, knocking occurs due to early ignition. On the other hand, when the air fuel mixture temperature falls below that temperature relying on the sparking, a misfire occurs. For this reason, difficult is the control of the air fuel mixture temperature. In addition, difficulty is experienced in changing the air fuel temperature rapidly, which makes it difficult to offer a stable combustion state.

SUMMARY OF THE INVENTION

Accordingly, it is an object of the present invention to provide a self-igniting engine capable of achieving a stable combustion state in a self-igniting operation range by controlling the fuel injection timing to overcome a difficulty of controlling the air fuel mixture temperature.

In accordance with the present invention, there is provided a self-igniting engine including fuel injection means for injecting a fuel directly into a combustion chamber, temperature increasing means for increasing a temperature of an air fuel mixture by evaporating the fuel to a self-igniting possible temperature causing a multi-point ignition, and injection timing control means for setting a fuel injection start timing in the middle of an intake stroke for a low-load operating condition and for setting the fuel injection start timing in the first half of a compression stroke for a high-load operating condition.

In this configuration, in a compression ignition driving range where there occurs multi-point ignition of premixed air fuel made by the evaporation of a fuel directly injected from the fuel injection means into the combustion chamber, temperature increasing means increases the air fuel mixture up to a compression ignition possible temperature, while the injection timing control means sets the fuel injection start timing in the middle of an intake stroke at a low-load driving and sets it in the first half of a compression stroke at high-load driving.

The above and other objects, features and advantages of the invention will become more clearly understood from the following description referring to the accompanying drawings.

DESCRIPTION OF THE PREFERRED EMBODIMENTS

Figure 1:
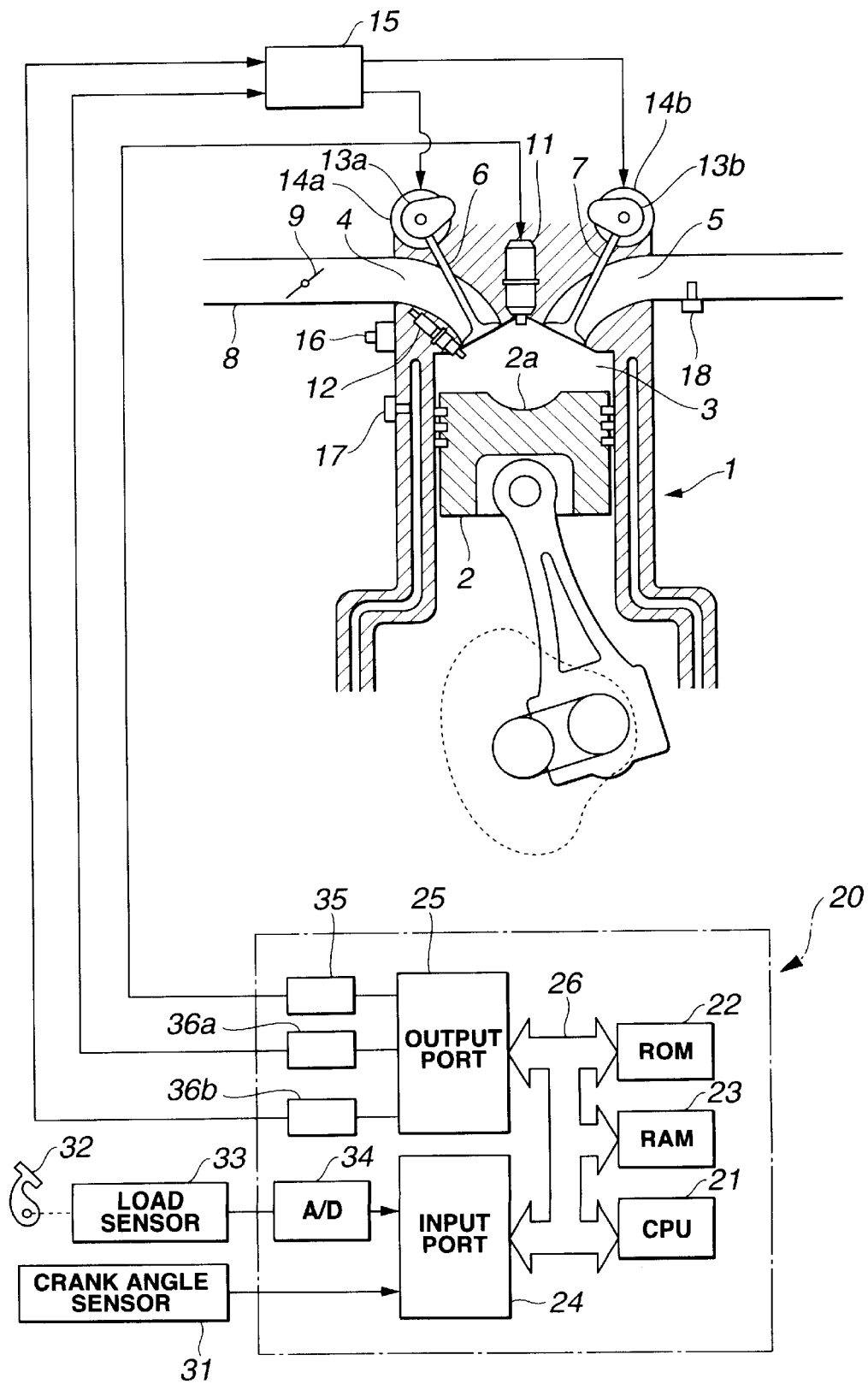
FIG. 1 is an illustration of the entire structure of a self-igniting engine according to a first embodiment.

A first embodiment of the present invention is shown in FIGS. 1 to 8. In FIG. 1, reference numeral 1 represents an engine body, numeral 2 represents a piston, numeral 3 represents a combustion chamber, numeral 4 designates an intake port, numeral 5 designates an exhaust port, numeral 6 designates an intake valve, and numeral 7 denotes an exhaust valve. A throttle valve 9 is placed in an intake passage 8 communicating with the intake port 4.

In addition, an injection nozzle for an injector 11 of an in-cylinder injection, serving as fuel injection means, is arranged to face the center of a top surface of the combustion chamber 3. And a curved concave piston cavity 2a is formed in a top surface of the piston 2 which is in opposed relation to the in-cylinder injector 11 in its injecting direction. Additionally, a sparking portion of a spark plug 12 is placed to face one side of the combustion chamber 3.

Moreover, an intake cam 13a and an exhaust cam 13b for opening/closing the intake valve 6 and the exhaust valve 7 are placed in a state connected to a variable valve timing (VVT) mechanism 14a or 14b. These VVT mechanisms 14a and 14b changes the rotational phase of the intake cam 13a or the exhaust cam 13b respectively through such an actuator as a hydraulic solenoid (or a solenoid valve) to perform variable control of the opening/closing timing of the intake valve 6 or the exhaust valve 7, each being operated under control of an actuating pressure (or an actuating signal) outputted from such an actuator 15 as a solenoid valve.

Incidentally, in the illustration, numeral 16 denotes a knock sensor, numeral 17 depicts a water temperature sensor and numeral 18 depicts an $O_2$ (Oxygen), sensor.

Signals obtained as the detection results by these sensors are inputted to an electronic control unit (ECU) 20. The electronic control unit (ECU) 20 basically comprises a microcomputer composed of a CPU 21, a ROM 22, a RAM 23, an input port 24, an output port 25 and other devices which are interconnected through a two-way bus 26 to each other.

In addition to the aforesaid sensors, a crank angle sensor 31, which generates a crank pulse at every crank angle, is connected to the input port 24, and a load sensor 33, which generates an output voltage proportional to an actuating (pressing, stepping) quantity of an accelerator pedal 32, is connected through an AID converter 34 to the input port 24.

Moreover, the output port 25 is connected through a drive circuit 35 to the in-cylinder injector 11, and is further connected through actuator drive circuits 36a and 36b to an actuator 15 which is made to individually operate the VVT mechanisms 14a and 14b.

Figure 2A:
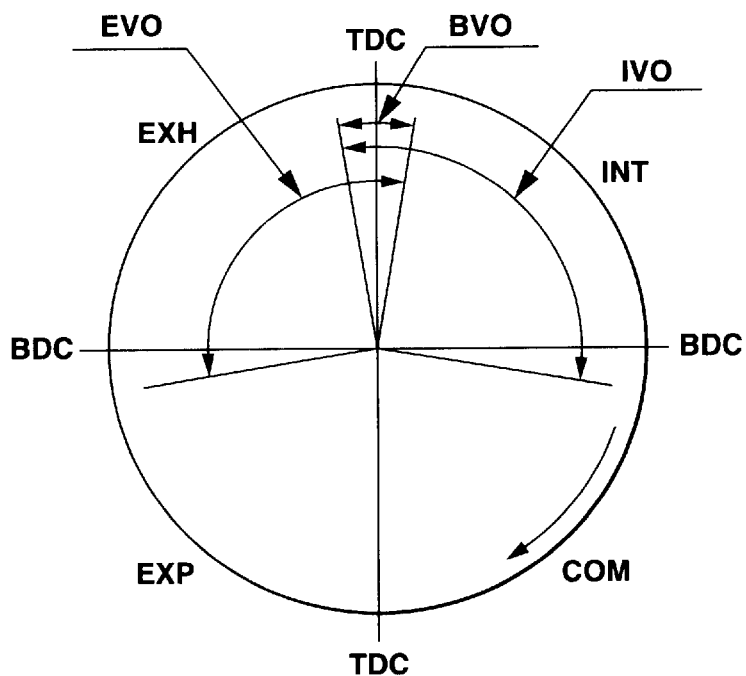
FIG. 2A is an illustration for explaining the control of valve opening time periods of an intake valve and an exhaust valve according to the first embodiment.
Figure 2B:
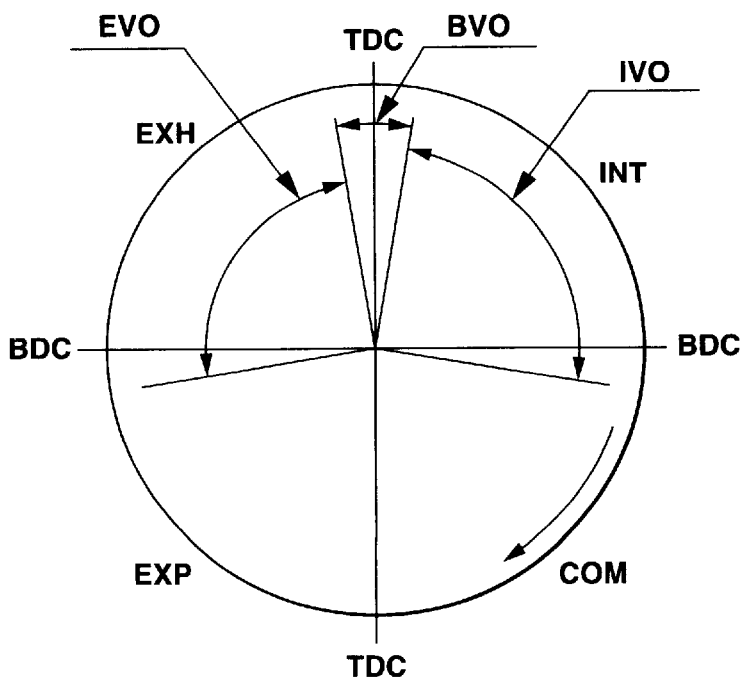
FIG. 2B is an illustration for explaining the control of valve opening time periods of an intake valve and an exhaust valve according to the first embodiment.
Figure 3:
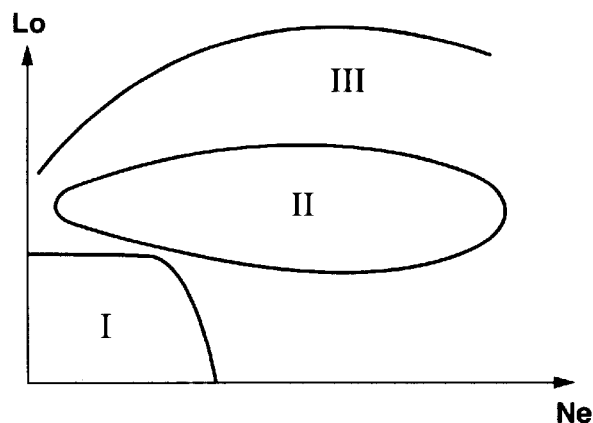
FIG. 3 is an illustration of a driving range according to the first embodiment.

In this embodiment, as FIG. 3 shows, th e driving range is divided into a driving range I at idling operation or low-speed and low-load operation, a compression ignition possible driving range II and a driving range III other than these ranges I and II in a manner th at an engine speed Ne and an engine load Lo are used as parameters. In addition, as FIG. 2A shows, the valve timings in the driving ranges I and III are controlled so that a positive overlap period BVO for which both the valves 6 and 7 take the opening conditions is set up for a period from the late part of an exhaust stroke to the early part of an intake stroke. On the other hand, as FIG. 2B shows, in the driving range II, a negative overlap period BVC for which both the valves 6 and 7 take the closure conditions is set up for a period from the end of an exhaust stroke and the beginning of an intake stroke.

Furthermore, as combustion modes, a stratified combustion control is implemented in the driving range I, the compression ignition combustion control is implemented in the driving range II, and uniform combustion control is executed in the driving range III.

Under the stratified combustion control, a fuel is injected from the in-cylinder injector 11 toward the piston cavity 2a made in the piston 2 at a relatively late timing such as a late part of a compression stroke, and the injected fuel rises along the curved concave surface of the piston cavity 2a so that a relatively rich air fuel mixture gathers around the sparking portion of the spark plug 12 to provide a satisfactory ignition characteristic.

Under the uniform combustion control, the fuel is injected from the in-cylinder injector 11 into the combustion chamber at such a relatively early timing as the beginning of an intake stroke to promote to mix the fuel injected and fresh air so that a homogenized air fuel mixture is produced at the ignition by the spark plug 12.

On the other hand, in the driving range II, during the negative overlap period BVC (see FIG. 2B) for which both the intake valve 6 and exhaust valve 7 are in the closing condition, or during a period from an intake stroke to the first half of a compression stroke, the fuel is injected from the injector 11 to produce a uniform premixed air fuel mixture before the gas temperature in the combustion chamber 3 reaches the self-igniting condition possible temperature. So that, when the gas temperature reaches the self-igniting temperature, the air fuel mixture in the combustion chamber 3 is ignited simultaneously, thereby realizing multi-point ignition combustion, that is, the combustion that the flame does not propagate, so to speak, the combustion made by an infinity number of spark plugs.

More concretely, in the driving range II, during the negative overlap period BVC for which both the intake valve 6 and exhaust valve 7 are in the closing condition, the residual gas kept in the combustion chamber 3 is pressurized to rise in temperature in accordance with the lifting of the piston 2, and the temperature of fresh air taken in the subsequent intake stroke increases due to the residual gas, and further the temperature of this fresh air increases by the subsequent compression stroke, then reaching the self-igniting possible temperature.

The combustion temperature of the air fuel mixture by the self-igniting combustion is approximately 1800° C., and is lower by approximately 200° C. than the combustion based on the ordinary ignition. In addition, since the air fuel mixture is ignited simultaneously, rapid low-temperature combustion becomes feasible. In consequence, owing to the low-temperature combustion, the discharging quantity of NOx is reducible, and because of the simultaneous ignition, the thermal efficiency becomes high and the lean combustion becomes possible accordingly so that the exhaust gas can substantially become clean while the fuel consumption being kept close to that of a diesel engine.

In this connection, low-cetane-value gasoline or methanol is used. It has been known that even such a low-cetane-value fuel, for example, gasoline, allows the self-igniting condition when the gas temperature in the combustion chamber 3 exceeds approximately 900° C. In this embodiment, the temperature increase by the pressurization of the residual gas and the normal compression ratio are used as temperature increasing means, and the gas temperature is set through the use of these functions to reach the compression ignition possible temperature.

That is, in the case of the constant volume cycle, the theoretical thermal efficiency ηth is given by the following equation:

$$\eta{th}=1-(1/\epsilon^{\kappa-1})$$

where $\epsilon$: compression ratio and $\kappa$: ratio of specific heat.

Accordingly, when the ratio $\kappa$ of specific heat is increased by the pressurization temperature increase of the residual gas, it is possible to raise the gas temperature up to the self-igniting temperature within a practical range without increasing the compression ratio $\epsilon$ considerably. In this embodiment, the compression ratio is set to be in a range of 14 to 20.

Figure 8:
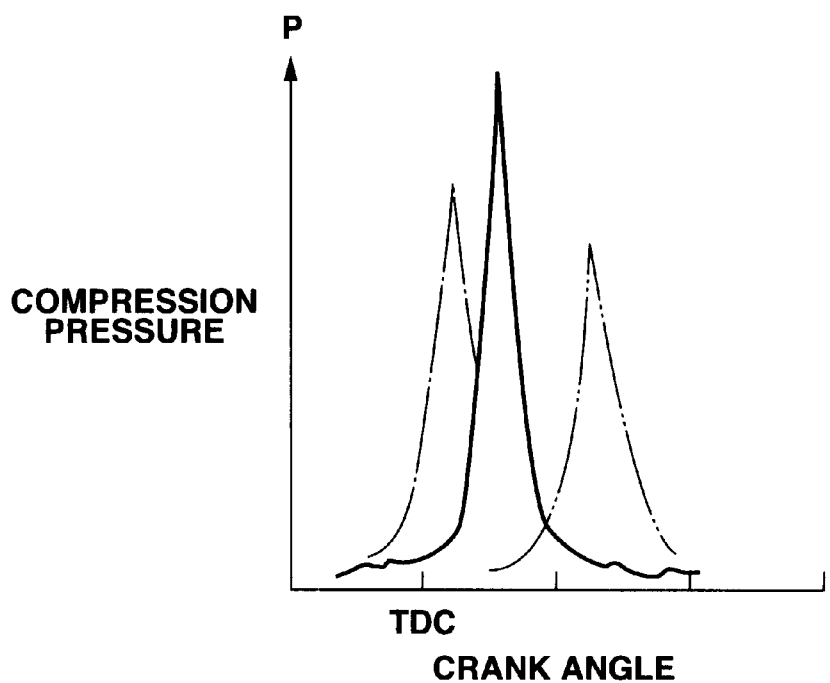
FIG. 8 is an illustration for explaining a combustion pressure at the self-igniting combustion according to the first embodiment.

In this case, it is said that, as indicated by a solid line in FIG. 8, if the maximum value of the combustion is set at a portion passing by the compression top dead center, the ideal combustion, which does not produce the knocking, is attainable. Naturally, the self-igniting timing at this time is immediately before the end of the compression stroke. The electronic control unit (ECU) 20 controls the self-igniting timing on the premixed air fuel through the control of the fuel injection timing.

Figure 4:
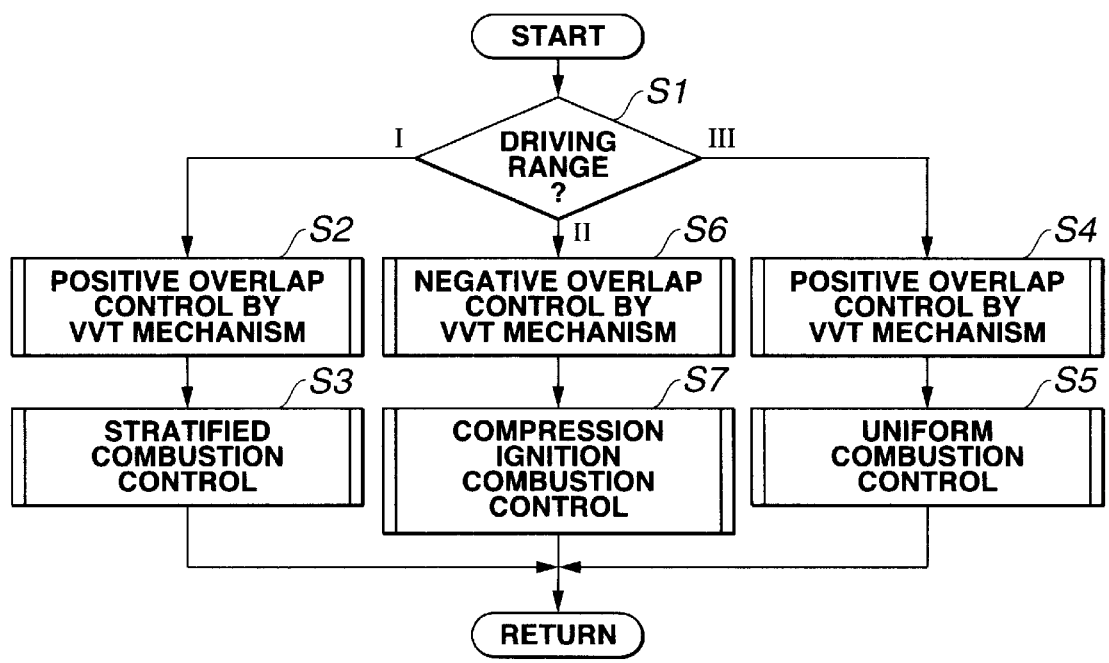
FIG. 4 is a flow chart showing a combustion mode setting routine according to the first embodiment.
Figure 5:
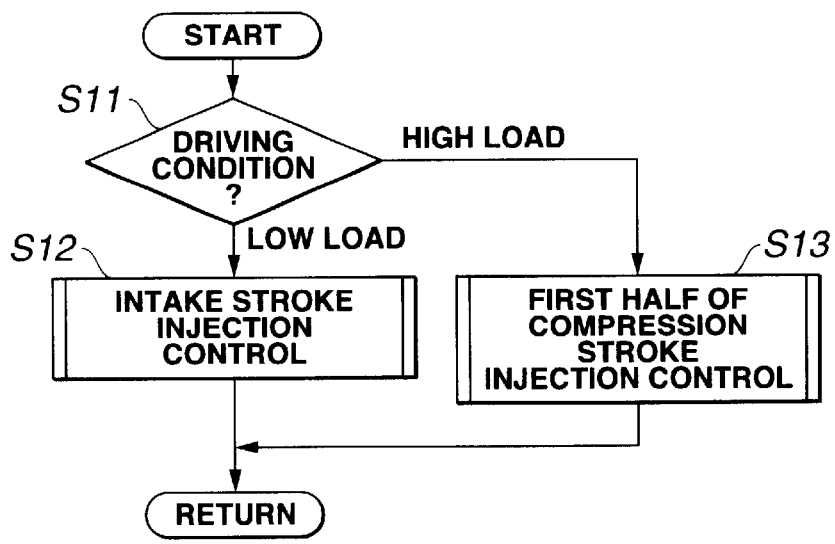
FIG. 5 is a flow chart showing an injection control routine at a self-igniting combustion according to the first embodiment.

Concretely, the process is conducted as shown in the flow charts of FIGS. 4 and 5. FIG. 4 shows a combustion mode setting routine. In this routine, in step S1, with reference to a map shown in FIG. 3, the driving range is determined on the basis of engine driving condition detecting parameters such as an engine speed Ne and an engine load Lo.

If a decision is made that the driving condition is a low-speed low-load state, including an idling driving state, which exists in the driving range I, the operational flow advances to a step S2 to output, to the actuator 15, drive signals for changing the rotational phases of the intake cam 13*a* and the exhaust cam 13*b* so that both the intake valve 6 and exhaust valve 7 take the opening condition for a period from a late part of an exhaust stroke to an early part of an intake stroke by the VVT mechanisms 14*a* and 14*b* to establish the positive overlap period BVO (see FIG. 2A). Following this, the operational flow advances to a step S3 for setting the combustion mode at stratified combustion control based on the ignition by the spark plug 12. Thereafter, this routine comes to an end.

Incidentally, a well-known technique is employed for the fuel injection timing at the stratified combustion control, and the description thereof will be omitted for brevity.

On the other hand, when the driving condition is in the driving range III, the operational flow goes to a step S4 in which, as well as the step S2, drive signals for changing the rotational phases of the intake cam 13*a* and the exhaust cam 13*b* are outputted to the actuator 15 so that both the intake valve 6 and exhaust valve 7 take the opening condition for a period from a late part of an exhaust stroke to an early part of an intake stroke by means of the VVT mechanisms 14*a* and 14*b* to set up the positive overlap period BVO (see FIG. 2A). Following this, the operational flow advances to a step S5 for setting the combustion mode at uniform combustion control based on the self-igniting by the spark plug 12. Thereafter, this routine comes to an end.

Incidentally, a well-known technique is employed for the fuel injection timing at the uniform combustion control, and the description thereof will be omitted for brevity.

Furthermore, when the driving condition is in the self-igniting range forming the driving range II, the operational flow proceeds to a step S6 in which drive signals for changing the rotational phases of the intake cam 13*a* and the exhaust cam 13*b* are outputted to the actuator 15 so that both the intake valve 6 and exhaust valve 7 take the closure condition for a period from the end of an exhaust stroke to the beginning of an intake stroke by means of the VVT mechanisms 14*a* and 14*b* to set up the negative overlap period BVC (see FIG. 2B). Following this, the operational flow advances to a step S7 for setting the combustion mode at the self-igniting combustion control. Thereafter, this routine comes to an end.

In the combustion mode setting routine shown in FIG. 4, upon the selection of the self-igniting combustion, the self-igniting injection control routine as shown in FIG. 5 is initiated, and a step S11 is first implemented to make a decision on the driving condition on the basis of engine driving condition detecting parameters such as an engine speed Ne and an engine load Lo. If the decision shows low-load driving, the operational flow proceeds to a step S12 to implement the intake stroke injection control, and then this routine comes to an end. On the other hand, if the decision shows high-load driving, the operational flow proceeds to a step S13 to execute the first-half injection control of the compression stroke, and then this routine comes to an end.

Figure 6:
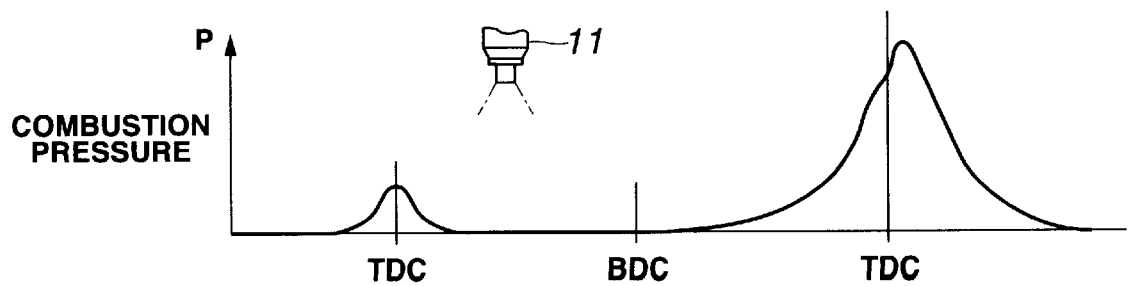
FIG. 6 is an illustration for explaining a fuel injection timing according to the first embodiment.

Upon the implementation of the intake stroke injection control in the step S12, an injection start signal is outputted when the piston 2 in the cylinder undergoing the fuel injection reaches a set crank angle in the first half of the intake stroke (see FIG. 6).

Figure 7:
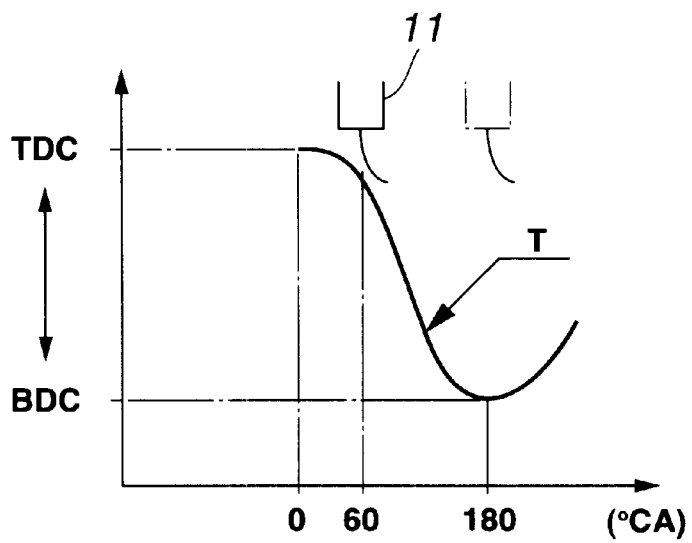
FIG. 7 is an illustration for explaining the relationship between a top surface of a piston and fuel injection at an intake stroke according to the first embodiment.

Since the fuel injection start timing at low-load driving is set in the first half of the intake stroke, the fuel injected entirely evaporates to produce premixed air fuel up to the self-igniting timing, thus promoting the self-igniting. In this case, as FIG. 7 shows, preferably, the fuel injection start timing is set at a timing that the tip portion of the fuel spray toward the top surface T of the piston 2 at the intake stroke follows the piston 2 without coming into contact with the top surface T of the piston. In this embodiment, it is set at approximately 60° CA (Cam Angle) after the top dead center of the exhaust stroke.

Since the injection is conducted in a state where the tip portion of the fuel spray at the lowering stroke follows the piston 2 without attaching itself to the piston top surface T, the fuel is efficiently diffused to produce the homogenized and premixed air fuel mixture within the combustion chamber 3.

In this case, if the fuel is injected at the vicinity of the end of the intake stroke as indicated by, for example, a dashed line in the same illustration, since the gas within the combustion chamber 3 is compressed by lifting the piston 2 at the compression stroke, the fuel injected from the in-cylinder injector 11 is not sufficiently diffused, which makes it difficult to offer the homogenized and premixed air fuel mixture. Moreover, if the fuel is injected at the beginning of the intake stroke, since the injected fuel comes into collision (abutting condition) with the top surface of the piston 2 to drop therefrom, it is difficult that the fuel evaporates entirely.

In addition, upon the implementation of the first-half injection control in the compression stroke in the step S13, an injection start signal is outputted when the position 2 in the cylinder undergoing the fuel injection reaches a set crank angle in the first half of the compression stroke.

Since the fuel injection start timing at high-load driving is set in the first half of the compression stroke, only a portion of the fuel produces the premixed air fuel mixture while the remaining fuel is dispersed within the combustion chamber 3 in the form of fuel-drop (liquid form) and hence, when the premixed air fuel mixture is compression-ignited, this acts as a heat source to successively combust the fuel produced by the evaporation of the fuel-drop, thereby suppressing the preignition indicated by a dashed line in FIG. 8 and achieving the self-igniting combustion at a combustion position indicated by a solid line in the same illustration. In this connection, in this embodiment, the fuel injection start timing is set at approximately 240° CA after the top dead center of the exhaust stroke.

In this case, it is also possible that the fuel injection start timing assumes a variable value setted previously according to the driving conditions.

As stated above, in this embodiment, since the fuel injection timing is variably setted according to the driving conditions, it is possible to realize the optimum self-igniting combustion for obtaining stable combustion in the self-igniting possible range. In addition, in the driving range II (self-igniting possible range), both the valves 6 and 7 take the closing condition for a period from the end of the exhaust stroke to the early part of the intake stroke to set up the negative overlap period BVC for which the residual gas is pressurized by the temperature increase; therefore, it is possible to provide a high ratio of the specific heat and to easily raise the gas temperature in the combustion chamber 3 up to the self-igniting possible temperature, which can control the temperature of the combustion chamber 3.

Figure 9:
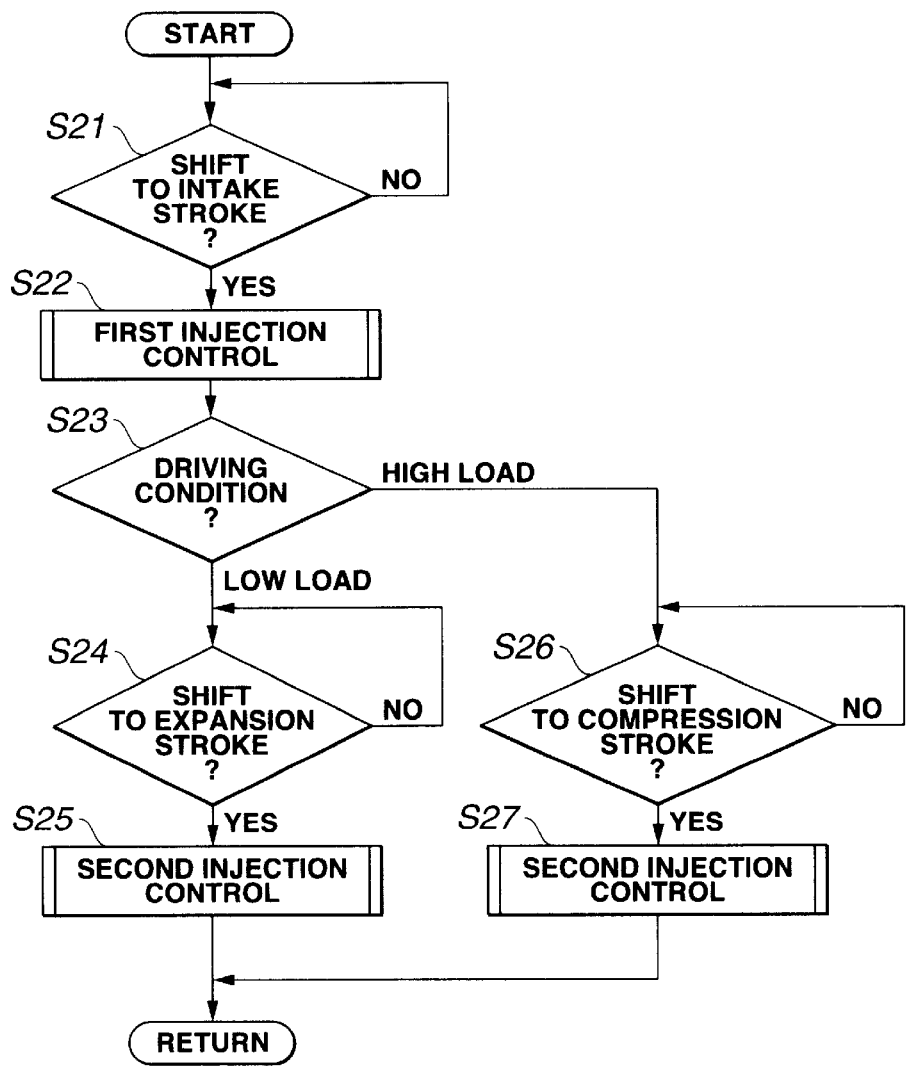
FIG. 9 is a flow chart showing an injection control routine at the self-igniting combustion according to a second embodiment.

Furthermore, a second embodiment of the present invention will be described hereinbelow with reference to FIGS. 9 to 11. In this embodiment, the fuel is injected twice during one cycle to expand the driving range II forming the self-igniting possible range.

That is, when the self-igniting combustion control is selected in the combustion mode setting routine of the first embodiment shown in FIG. 4, an injection control routine at the self-igniting combustion is initiated, and a step S21 is first implemented to check whether or not the cylinder to be subjected to fuel injection has shifted to an intake stroke. When it has shifted to the intake stroke, the operational flow goes to a step S22 to implement the first injection control.

In this first injection control, the crank angle is counted from when the top dead center of the exhaust stroke has been passed, or the elapsed time is measured, and the fuel injection is initiated when it reaches a predetermined crank angle (in this embodiment, approximately 60° CA) in the first half of the intake stroke.

As in the case of the first embodiment, the fuel first injected enables the production of the uniform premixed air fuel mixture before the gas temperature in the combustion chamber 3 reaches the self-igniting possible temperature.

Subsequently, a step S23 follows to make a decision on a driving condition on the basis of engine driving condition detecting parameter such as an engine load Lo and an engine speed Ne. If the decision shows a low-load driving, the operational flow advances to a step S24 so that a standby condition is taken until the cylinder to be subjected to the fuel injection shifts to the expansion stroke. When it has shifted to the expansion stroke, the operational flow advances to a step S25 to implement the second injection control, and then this routine comes to an end.

Figure 10A:
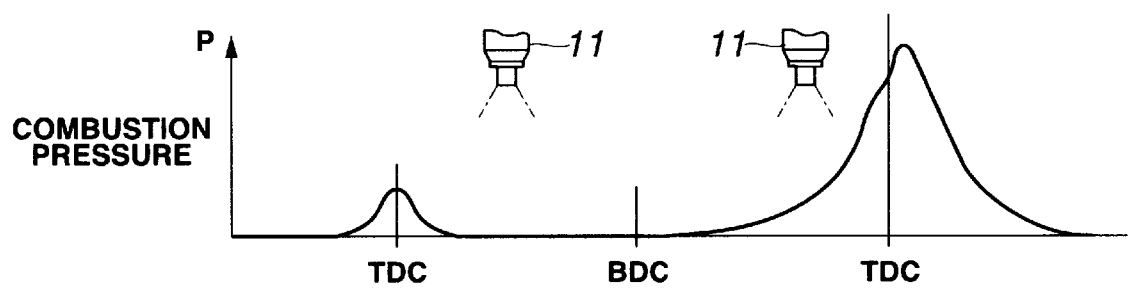
FIG. 10A is an illustration for explaining a fuel injection timing at a high-load driving condition according to the second embodiment.
Figure 10B:
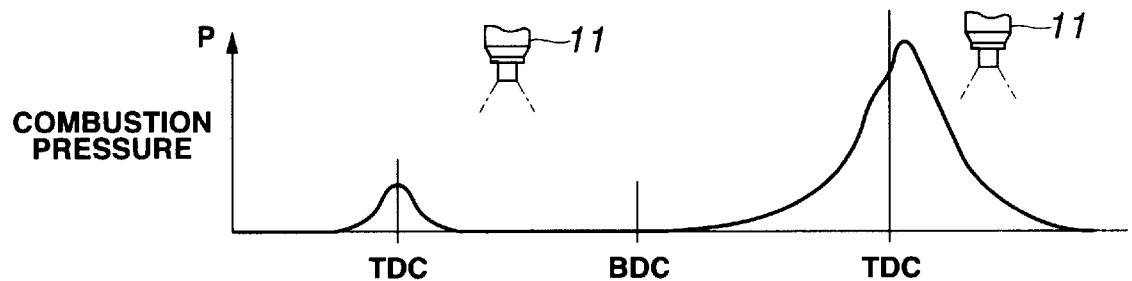
FIG. 10B is an illustration for explaining a fuel injection timing at a low-load driving condition according to the second embodiment.

In the second injection control, the crank angle is counted from when the top dead center of the compression stroke has been passed, or the elapsed time is measured, and the fuel injection is initiated when it reaches a predetermined crank angle in the first half of the expansion stroke (see FIG. 10B).

The fuel injection quantity under the second injection control is set to be smaller than the first fuel injection quantity. In this embodiment, the ratio of the first fuel injection quantity and the second fuel injection quantity is set to be 7:3. Incidentally, the air fuel ratio A/F is based on the sum total of the first and second fuel injection quantities.

Since the second fuel injection timing at low-load operation is set in the first half of the expansion stroke, the exhaust gas temperature rises. And consequently, the residual gas temperature further rises during the next negative overlap period BVC (see FIG. 2B) for which both the intake valve 6 and exhaust valve 7 take the closure condition between the end of the exhaust stroke and the beginning of the intake stroke, and a higher ratio of specific heat is obtainable accordingly, which promoting the next self-igniting combustion.

When the decision in the step S23 shows high-load driving, the operational flow advances to a step S26 where the standby condition is taken until the cylinder to be subjected to the fuel injection has shifted to the compression stroke, and when it has shifted to the compression stroke, the operational flow advances to a step S27 to implement the second fuel injection control, and then this routine comes to an end.

In the second injection control at the high-load driving, the crank angle is counted from when the piston 2 has passed through the bottom dead center of the intake stroke, or the elapsed time is measured, and the fuel injection is conducted when it reaches a predetermined crank angle in the second half of the compression stroke (see FIG. 10A).

The second fuel injection quantity at high-load operating condition is set to form a ratio similar to that of the fuel injection quantities at the low-load operating condition, and naturally, the air fuel ratio A/F is based on the sum total of the first and second fuel injection quantities.

Since, at the low-load operating condition, the second fuel injection timing is set in the second half of the compression stroke, liquid-drop-like fuel is dispersed in the combustion chamber 3 in the middle of self-igniting combustion, and the fuel generated by the evaporation of the fuel-drop is combusted (burnt) consecutively, thereby suppressing the preignition and to offer the ideal self-igniting combustion.

Figure 11:
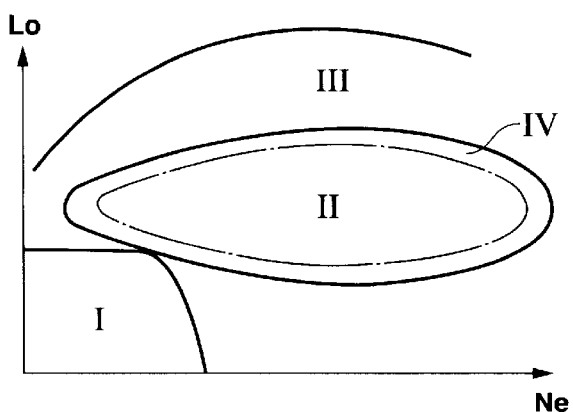
FIG. 11 is an illustration for explaining a driving range according to the second embodiment.

As stated above, since the fuel injection is made in two stages during one cycle, the self-igniting combustion is promoted at the low-load driving while the self-igniting combustion is suppressed at the high-load operating condition to prevent the preignition; in consequence, as shown in FIG. 11, as compared with the range of the first embodiment indicated by a broken line, the driving range II forming a self-igniting possible range can be expanded by a driving range IV defined at the outside thereof. This not only achieves further improvement of the fuel consumption but also realizes the reduction of the exhaust emission, and even provides the stable combustion.

In addition, as in the case of the first embodiment, in the driving range II (compression ignition possible range), since both the valves 6 and 7 are set in the closure condition for a period from the end of the exhaust stroke to the beginning of the intake stroke to establish the negative overlap period BVC for which the residual gas is temperature-increased by pressurization, the ratio of specific heat becomes higher, and the gas temperature in the combustion chamber 3 can easily be increased up to the self-igniting possible temperature, thus enable the temperature control of the combustion chamber 3.

The present invention is not limited to the above-described embodiments, but for example, the intake valve 6 and the exhaust valve 7 can be adaptable of an electromagnetic controlled valve, and in this case, the valve opening/closing timings can be controlled variably without using the VVT mechanism.

In addition, it is also appropriate that the exhaust throttle valve is placed in the exhaust passage, and in the self-igniting possible range, a portion of the exhaust gas is restricted by the exhaust throttle valve in the second half of the exhaust stroke, and at the beginning of the intake stroke, the exhaust valve is opened, thereby producing the internal EGR. In this case, there is no need to establish the negative overlap period BVC.

Still additionally, it is also possible that the first fuel injection timing and the second fuel injection timing are set as a fixed value or that they assume a variable value set on the basis of driving parameters.

As described above, according to the present invention, it is possible to acquire stable combustion conditions in self-igniting driving range by additionally implementing the fuel injection timing control so as to overcome the difficulty in the control of the air fuel mixture temperature.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A self-igniting engine comprising:

fuel injection means for injecting a fuel directly into a combustion chamber;

temperature increasing means for increasing a temperature of an air fuel mixture, by evaporating said fuel to a self-igniting possible temperature causing a multi-point ignition; and injection timing control means for setting a fuel injection start timing in the middle of an intake stroke for a low-load operating condition and for setting said fuel injection start timing in the first half of a compression stroke for a high-load operating condition.

2. The self-igniting engine according to claim 1, wherein said temperature increasing means includes a variable valve timing mechanism for operating an intake/exhaust valve into a closing condition for a predetermined period from the end of an exhaust stroke to the beginning of said intake stroke.

3. The self-igniting engine according to claim 1, wherein said injection timing control means variably sets said fuel injection start timing in accordance with engine driving conditions.

4. A self-igniting engine comprising:

fuel injection means for injecting a fuel directly into a combustion chamber;

temperature increasing means for increasing a temperature of an air fuel mixture by evaporating said fuel to a self-igniting possible temperature causing a multi-point ignition; and injection timing control means for setting a fuel injection start timing in a compression ignition driving range, wherein said injection timing control means sets first fuel injection in the middle of an intake stroke and sets second fuel injection in the second half of a compression stroke for high-load operating condition.

5. The self-igniting engine according to claim 4, wherein said temperature increasing means includes a variable valve timing mechanism for operating an intake/exhaust valve into a closing condition for a predetermined period from the end of an exhaust stroke to the beginning of said intake stroke.

6. The self-igniting engine according to claim 4, wherein said injection timing control means variably sets said fuel injection start timing in accordance with engine driving conditions.

* * * * *